United States Patent Office 2,995,428
Patented Aug. 8, 1961

2,995,428
THERMALLY STABLE DISTILLATE FUELS
Richard L. Godar, Crestwood, and Verner L. Stromberg, Shrewsbury, Mo., assignors to Petrolite Corporation, Wilmington, Del., a corporation of Delaware
No Drawing. Filed Oct. 21, 1957, Ser. No. 691,153
4 Claims. (Cl. 44—71)

This invention relates to distillate hydrocarbon fuels. More particularly it relates to distillate hydrocarbon fuels which have been stabilized with respect to the formation of sludge and undesirable color bodies at elevated temperatures. The fuels of this invention are particularly useful in engines, such as jet and diesel engines, where the fuel is subjected to elevated temperatures prior to combustion and the problem of thermal stability of the fuel arises.

Fuels which are not thermally stable, when employed in, for example, jet and diesel engines, tend to decompose with the formation of sludge, gums and other carbonaceous materials in the fuel system components which are maintained at an elevated temperature. These decomposition or degradation products then deposit on the walls or in small passages of the fuel system, such as the injection nozzles, causing their malfunction.

It has now been found that distillate hydrocarbon fuels which are not thermally stable can be rendered thermally stable by the incorporation therein of a small amount of the soluble basic reaction product obtained by heating below the pyrolytic point a diamide of the formula $$\begin{array}{c}H\\ \diagdown\\ N-R-(NR)_n-N\\ R''C\diagup\quad\quad\diagdown CR''\\ \parallel\quad\quad\quad\quad\parallel\\ O\quad\quad\quad\quad O\end{array}\begin{array}{c}R_1\\ \diagup\\ \end{array}$$

in which R''CO is the naphthenyl radical of a naphthenic acid within the molecular weight range 200 to 500; R is an alkyene radical having not over 6 carbon atoms, R₁ is hydrogen or a low molal alkyl radical having less than 8 carbon atoms, and $n$ is a small whole number varying from 1 to 4. The formation of the diamide derived product involves at least one of the two reactions of polymerization and dehydration and the elimination of from .5 to 1.5 moles of water per molecule of diamide. The product is further characterized by the absence of a cyclic amidine structure.

The distillate hydrocarbon fuels useful in forming the compositions of the invention can have a boiling range of 135° F. to 700° F. Conventional jet fuels, since they are blends of gasoline and kerosene fractions, normally have a wide boiling range with an initial boiling point of as low as about 135° F., and an end point as high as 600° F. Conventional diesel fuels also normally have a rather wide boiling range of about 350° F. to 700° F. or higher. The amount of inhibitor in the compositions of the invention is generally in the range of about 10 to 500 parts per million. This is equivalent to about 0.2 to about 10.4 milliliters of inhibitor to each 5.5 gallons of distillate hydrocarbon.

For convenience, what is said hereinafter will be divided into fiive parts;

Part 1 is concerned with the composition or structure of the non-cyclic dehydration and/or polymerization products obtained by the elimination of one mole of water, or approximately so, from a diamide:

Part 2 is concerned with polyamines of the kind suitable for reactants in the preparation of the herein described inhibiting agent:

Part 3 is concerned with naphthenic acids;

Part 4 is concerned with the preparation of the herein described inhibitors and for purposes of convenience will be divided into two sections; part 4, section A, is concerned with the preparation of diamides; Part 4, Section B, is concerned with the preparation of dehydration and/or polymerization products by elimination of one mole of water or a substantial fraction thereof from the diamide. Needless to say, the herein described dehydration and/or polymerization product is obtained on a practical scale in a single step operation. One need not stop at the diamide stage and then convert. However, the products are best characterized by noting the structure of the diamide and thus for purpose of convenience such presentation is herein employed.

Part 5 is concerned with specific examples of the utility and effectiveness of the herein described inhibitors.

PART 1

The formation of diamides from a monocarboxy acid and a polyamine is well known. The conversion of a monoamide or a diamide, as the case may be, into cyclic amidine, such as an imidazoline, is well known. For instance, in the case of stearic acid and tetraethylene pentamine it may be illustrated thus:

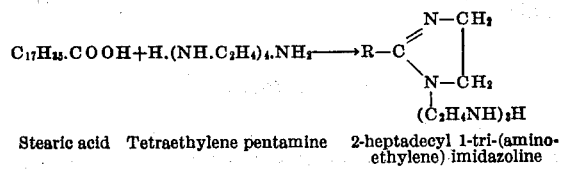

Stearic acid Tetraethylene pentamine   2-heptadecyl 1-tri-(aminoethylene) imidazoline However, if one examines the structural formulas of a typical naphthenic acid of the kind herein employed as described in Part 3 following, it is obvious that steric hindrance would be expected to prevent the formation of the cyclic amidines. See, for example, J.A.C.S. vol. 61, No. 19, 1939, pp. 3195-7 The author is Aspinall. Such specific explanation in respect to such reaction, or similar reaction, appears in U.S. Patent No. 2,291,396, dated July 28, 1942, to Lieber, as follows:

"Although the mechanism of the operation of this invention is not well understood, it is believed that the following reactions occur:

(1) Salt formation:
H₂NCH₂CH₂NHCH₂CH₂NH₂+R·COOH⟶
R.COOH₂NCH₂CH₂NHCH₂CH₂NH₂OOC·R

| Heat (—H₂O)

(2) Amide formation
R·COHNCH₂CH₂NHCH₂CH₂NHOC·R (3) Polymerization by intermolecular
nitrile formation: (e.g. from 2 mols  | Heat (—H₂O)
of above)

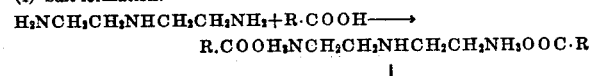
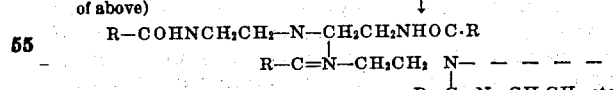

"Also, intra-molecular nitrile formation is possible. There is also a possibility that upon heating, the OH group of the fatty acid may combine with a hydrogen in the amine compound, for instance, with the hydrogen in the NH group, with the resultant liberation of water vapor and the consequent formation of an acyl derivative of the polyalkylene polyamine and subsequent polymerization."

The above reaction of course is a conventional one and in essence depends on the migration of the hydrogen atom attached to nitrogen to the oxygen atom double bonded to carbon, thus forming a single bonded hydrogen atom and the double bond between the carbon and nitrogen atoms.

However, in the preparation of products following the use of naphthenic acids even with a triamine the final product invariably is basic indicating the presence of at least one basic nitrogen radical. Further attention is directed to the infrared spectrogram of a product of the kind described in Part 4 and derived from the reaction of one mole of diethylene triamine and 2 moles of naphthenic acid with elimination of 3 moles of water. Examination of the infrared spectrogram clearly indicates the absence of a cyclic amidine (imidazoline) radical and thus is in agreement with the Aspinall reference as above noted. For this reason the herein specified products have been characterized as the basic derivatives obtained from polyamines of the kind described in Part 2 in combination with the acids described in Part 3 with the proviso that the initial reactant ratio be two parts of acid to one of amine with the elimination of any excess, with two moles of water and not over 3.5 moles of water per mole of amine without ring formation.

PART 2

The polyamines employed are alkylene polamines having at least 3 basic nitrogen atoms and characterized by the fact that they are terminally acylation susceptible so as to yield diamides, i.e., susceptible to acylation in each terminal position. They correspond to the following formula:

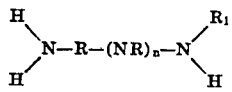

in which $R_1$ is an alkylene radical having not over 7 carbon atoms.

$R_1$ is a member of the class selected from hydrogen and low molal alkyl radicals such as methyl, ethyl, butyl, etc., but in any event having less than 8 carbon atoms. For this purpose the cyclohexyl radical is considered the same as a hexyl radical, and $n$ is a small whole number varying from 1 to 4.

Generally speaking, the alkylene radicals are selected from the class consisting of

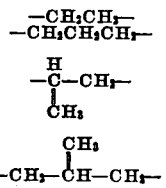

They may consist, however, of a hexamethylene radical, i.e., as many as 6 carbon atoms.

As is well known, low molal amines, such as methylamine, ethylamine, or cyclohexylamine, can be treated with either 2 moles of ethylene imine or two moles of acrylonitrile followed by reduction to yield amines of the type in which R' is a low molal alkyl group and $R_1$ and $R_2$ are hydrogen. The two occurrences of R need not be identical as, for example, similar reactants involving ethylene diamine and propylene imine, or ethylene diamine and one or two moles of acrylonitrile, followed by reduction.

However, for all practical purposes the most readily available amines which are suitable are ethylene diamine, diethylene triamine, triethylenetetramine, tetraethylenepentamine and mixtures of higher amines such as hexamines, heptamines, etc.

Another suitable amine, although higher in price than those above noted, is 3,3'-iminobispropylamine.

PART 3

The monocarboxy acids employed in the present invention as reactants are naphthenic acids. As to the description of naphthenic acids reference is made to Industrial and Engineering Chemistry, vol. 41, No. 10, October 1949, pages 2080–2090, as follows:

"The most widely used is naphthenic acid, a petroleum refining by-product obtained when the alkali liquor from the caustic treatment of gas oil is acidified with sulfuric acid. This treatment produces a dark brown (about 12 on the Gardner color scale when cut 1 to 9 with mineral spirits) oily liquid which separates to the top of the aqueous liquor. The mixed acids can be divided roughly into three groups having the general formulas: $C_nH_{2n}O_2$, $C_nH_{2n-2}O_2$, and $C_nH_{2n-4}O_2$. The first group occurs largely in the lower boiling fraction of the mixture. They usually contain 6 or 7 carbon atoms and are colorless. The second group, usually the largest, contains acids of 8 to 12 carbon atoms having the structure:

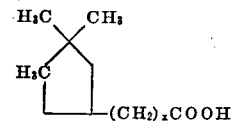

The third group contains the heaviest molecules which are polycyclic and have from 12 to 23 carbon atoms. All fractions from a carefully distilled naphthenic acid (24) contain some color which, so far, has proved impossible to remove. Tarry residues account for the dark color of the crude, but these are largely removed by distillation. Since naphthenic acids are saturated and primarily cyclic, their soaps have much greater stability than those of other common liquid acids. The crude acid as delivered has a density of 8.04 to 8.44 pounds per gallon and a viscosity of 1.25 poises at 77° F. The acid values range from 160 to 270, but naphthenic acid used for soap manufacture usually has an acid value between 220 and 230. pH of the water extract is about 5.5 and the iodine value between 8 and 11. Unsaponifiables are held below 12%. The initial boiling points vary widely from shipment to shipment. Individual batches have boiled below 200° F. and up to almost 400° F. at 3.5 inches of mercury."

A typical formula in connection with some of the commercially available naphthenic acids is the following:

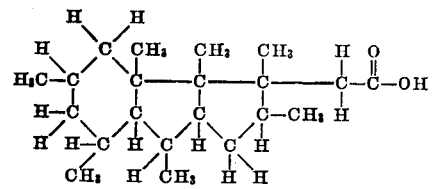

These particular acids are available in at least three different grades; Grade 1 having an average molecular weight of 290–300. Generally speaking, there is present about 6% of non-saponifiables and this type is perhaps characteristic of the most common commercially available naphthenic acid.

Grade 2 has a somewhat higher molecular weight, for instance 320–330 and contains about 8% of non-saponifiable matter. Grade 3, which finds considerable utility, has a molecular weight range of 410–420 and contains about 10% nonsaponifiable matter.

Any napthenic non-amidine forming acid may be used but preference is to use the commercial grades above described, or in some instances, mixtures of two different grades so as to give, for example, an average molecular weight of 360 to 370 in some instance, and in others, a molecular weight of about 310, or thereabouts.

In examining the formula immediately preceding, with the formula preceding the above formula, and ignoring difference in the cyclic structure of the naphthenic acids, it is apparent that in at least some naphthenic acids which are available commercially the cyclic structure is part of the beta carbon atom. On the other hand, as far as is known, and referring to the formula

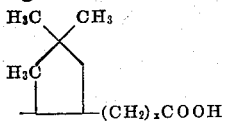

there are available naphthenic acids in which apparently $x$ in the formula represents a small whole number, for instance, 3 or 4 or the like. There is no reason to believe such napthenic acids cannot be converted into cyclic amidines.

The present invention is limited to naphthenic acids commercially available which do not form cyclic amidines. The claims specify that the product be free from a cyclic amidine structure, i.e., from an imidazoline structure, or a tetrahydropyrimidine structure. There is no difficulty in verifying the nature of the finished product in this respect. All that is necessary is appropriate infrared spectrogram which shows the absence of a cyclic amidine structure.

PART 4

Section A

As has been pointed out previously, the manufacture of diamides from one mole of a polyamine of the kind herein employed as a reactant and 2 moles of napthenic acid, is a procedure that is well known and simply means heating under such conditions as will convert the same into an amide by the elimination of 2 moles of water per mole of polyamine. The reaction sometimes is conducted by merely heating, other times by heating in vacuum, and other times using an insoluble solvent such as xylene to eliminate water formed. However, for the majority of purposes there is no need for a two-step process and thus Part 4, Section B, following includes data which in part is pertinent to the manufacture of a diamide.

Section B

The napthenic acids herein employed for the purpose of convenience may be indicated thus: R″COOH in which R″CO is the naphthenyl radical. In light of what has been said previously it is obvious that by reacting one mole of a suitable polyamine with 2 moles of a suitable naphthenic acid one could readily obtain a diamide, thus:

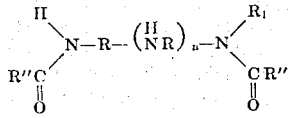

in which the various characters have their previous significance.

More specifically then, the compositions herein described are characterized by the soluble basic reaction product obtained by heating below the pyrolytic point a diamide of the formula

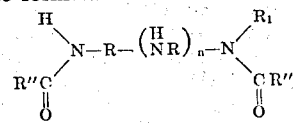

in which R″CO is the naphthenyl radical of a naphthenic acid within the molecular weight range of 200 to 500; R is an alkylene radical having not over 6 carbon atoms; $R_1$ is a member of the class selected from hydrogen and low molal alkyl radicals having less than 8 carbon atoms, and $n$ is a small whole number varying from 1 to 4; said diamide derived product involving at least one of two reactions of the class consisting of polymerization and dehydration; said product being further characterized by the absence of a cyclic amidine structure and said dehydration of the diamide eliminating from .5 to 1.5 moles of water per molecule of diamide.

In light of re-examination of the data, it seems it is quite likely the effective agent may be a nitrile amide, i.e., one terminal being an amide group, the other one a nitrile group, thus:

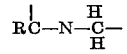

It has been pointed out previously there seems to be no question as to the composition of the diamide intermediate but there is a question as to the structure of the dehydration and/or polymerization product obtained by the elimination of one mole of water, or approximately one mole of water, from the diamide. This has been discussed in Part 1, preceding.

In preparing the herein described compounds in a single step operation, it is preferred to mix the 2 moles of naphthenic acid and 1 mole of diethylene triamine and add benzene or xylene in order to make the mixture more fluid and also to form azeotropes to carry overhead the water formed in the reaction. The mixture is then heated until water ceases to evolve overhead, the entrainer being continuously returned to the reaction vessel. When the reaction temperature reaches an equilibrium so that the temperature can no longer be raised because all the heat is being used to vaporize the entrainer, the entrainer, such as benzene or xylene, is removed as it distills off. The reaction may then be heated to about 280° C. for about 2 hours in order to be sure that the reaction has been driven to completion, although this maintained heating is not absolutely necessary.

As pointed out for purposes of describing the invention reference is made to a two-step process which can be a single-step process as above noted. Under certain conditions, however, there is an advantage to a two-step process. For example, mixing two different diamides and then subjecting the mixture to the dehydration (or polymerization)-step. It is doubtful that any specific example is required in any detail but purely by way of explanation the following is included: (Examples 1 to 4 appear in tabular form in Tables 1 and 2 along with tabulation of Example 5 and other examples).

Example 5

To 3520 grams of naphthenic acid (1.0 mol) and 51.5 grams diethylene triamine (0.5 mol.), 50 ml. of xylene was added. The mixture was heated under a water trap condenser in order to distill the water-xylene azeotrope mixture, with the xylene being returned continuously from the Dean and Stark water trap to the reaction mixture. After about a 2-hour reaction period, during which the water was removed from the trap to a graduate, the xylene also was removed from the trap as it condensed. The reaction was heated continuously until 280° C. was reached, and then maintained at this temperature for about 2 hours to insure that the reaction had been driven to completion, although this maintained heating is not absolutely necessary. The resulting product was a dark brown resin of such high viscosity that it did not flow readily at room temperature. The product was soluble in isopropyl alcohol, and the full range of hydrocarbons, including crude oil, kerosene and isooctane.

Example 6

200 grams of xylene was added to an admixture of 103 grams of diethylene triamine (1 mole) and 660 grams (2 moles) of a commercial naphthenic acid having the following characteristics.

| | |
|---|---|
| Acid No., mg. KOH/gram | 159 |
| Unsaponifiables, weight percent, A.O.C.S. $C_a6_a$–40 | 6.3 |
| Density$_4^{20}$ | 0.987 |
| Viscosity, SUS/210° F | 159 |
| Bromine No., ASTM D1158–52T | 10.7 |
| Refractive index, $N_D^{20}$ | 1.503 |
| Pour point, °F | 40 |
| Average mol. weight of deoiled acids [1] | 330 |
| Average molecular formula | $C_{21}H_{37}O_2$ |
| Average type formula | $C_nH_{2n-5}O_2$ |

[1] Calculated from acid number and percent unsaponifiable.

Distillation range, ° F., at 2 mm. Hg:
    Initial _____ 287
    5 _____ 330
    10 _____ 352
    20 _____ 370
    30 _____ 380
    40 _____ 392
    50 _____ 405
    60 _____ 422
    70 _____ 438
    80 _____ 460
    90 _____ 490
    95 _____ 510
    EP _____ 530
    Recovery _____percent__ 98

The mixture was heated under a water trap condenser in order to distill the water-xylene azeotrope mixture with the xylene being returned continuously from the Dean and Stark water trap to the reaction mixture. The heating was continued for 4 hours during which the reaction temperature was maintained at 165° C. and a total of 54 grams of water had been removed. The resulting product was a dark brown resin of such high viscosity that it did not flow readily at room temperature. The product was soluble in isopropyl alcohol, and the full range of hydrocarbons, including crude oil, kerosene and isooctane.

Note Examples 5 and 6 are described again in tabular form with all the pertinent data in Tables 1 and 2, following. Note also that Tables 1 and 2 illustrate a large number of examples of the present invention.

TABLE I.—DEHYDRATION AND/OR POLYMERIZATION PRODUCTS DERIVED BY ELIMINATION OF ONE MOLE OF WATER, OR A SUBSTANTIAL FRACTION THEREOF, FROM A DIAMIDE OF THE FOLLOWING FORMULA:

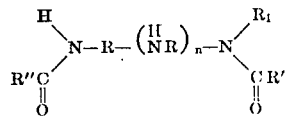

| Ex. No. | Naphthenyl radical (R'') from acid having mol. weight of approximately— | R | $R_1$ | n |
|---|---|---|---|---|
| 1 | 323 | $C_2H_4$ | H | 1 |
| 2 | 323 | $C_2H_4$ | H | 2 |
| 3 | 323 | $C_2H_4$ | H | 3 |
| 4 | 352 | $C_2H_4$ | H | 1 |
| 5 | 352 | $C_2H_4$ | H | 1 |
| 6 | 330 | $C_2H_4$ | H | 1 |
| 7 | 352 | $C_2H_4$ | H | 3 |
| 8 | 450 | $C_2H_4$ | H | 1 |
| 9 | 450 | $C_2H_4$ | H | 2 |
| 10 | 450 | $C_2H_4$ | $CH_3$ | 3 |
| 11 | 323 | $C_2H_4$ | $CH_3$ | 2 |
| 12 | 352 | $C_2H_4$ | $CH_3$ | 2 |
| 13 | 450 | $C_2H_4$ | $CH_3$ | 2 |
| 14 | 323 | $C_3H_6$ | H | 1 |
| 15 | 352 | $C_3H_6$ | H | 1 |
| 16 | 450 | $C_3H_6$ | H | 1 |
| 17 | 352 | $C_3H_6$ | $CH_3$ | 1 |
| 18 | 323 | $C_2H_4$ | $C_{12}H_{25}$ | 1 |
| 19 | 352 | $C_2H_4$ | $C_{12}H_{25}$ | 1 |

| Ex. No. | Mixture—Parts | R | $R_1$ | n |
|---|---|---|---|---|
| 20 | 323 | $C_2H_4$ | H | 1 Part N=2. / 1 Part N=1. |
| 21 | 352 | $C_2H_4$ | H | 1 Part N=2. / 1 Part N=1. |
| 22 | 450 | $C_2H_4$ | H | 1 Part N=2. / 1 Part N=1. |
| 23 | 352 | $C_2H_4$ | H | 1 Part N=3. / 3 Parts N=1. |

| Ex. No. | Mixture—Parts | R | $R_1$ | n |
|---|---|---|---|---|
| 24 | 1 Part M.W. 323. / 1 Part M.W. 352. | $C_2H_4$ | H | 1 |
| 25 | 1 Part M.W. 352. / 2 Parts M.W. 450. | $C_2H_4$ | H | 2 |
| 26 | 1 Part M.W. 200. / 1 Part M.W. 450. | $C_3H_5$ | H | 1 |

TABLE II.—DEHYDRATION AND/OR POLYMERIZATION PRODUCTS DERIVED BY ELIMINATION OF ONE (½ TO 1½) MOLE OF WATER, OR A SUBSTANTIAL FRACTION THEREOF, FROM TWO DIAMIDES OF THE FOLLOWING FORMULA:

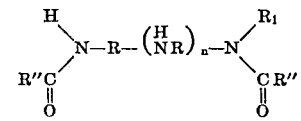

| Ex. No. | Time of heating (hours) | Maximum temperature of heating, ° C. | Amount water eliminated (mols) |
|---|---|---|---|
| 1 | 3 | 280 | 0.9 |
| 2 | 3½ | 280 | 1.1 |
| 3 | 3 | 280 | 1.5 |
| 4 | 2 | 280 | 0.7 |
| 5 | 1 | 280 | 1.3 |
| 6 | 4 | 165 | 1.0 |
| 7 | 4 | 280 | 1.3 |
| 8 | 1½ | 280 | 0.9 |
| 9 | 4 | 280 | 1.2 |
| 10 | 2 | 280 | 1.4 |
| 11 | 1 | 260 | 1.1 |
| 12 | 2 | 260 | 1.2 |
| 13 | 2 | 260 | 1.4 |
| 14 | 4 | 280 | 0.8 |
| 15 | 1 | 275 | 0.9 |
| 16 | 1 | 280 | 1.1 |
| 17 | 4 | 280 | 0.5 |
| 18 | 3 | 275 | 0.5 |
| 19 | 2 | 280 | 0.8 |
| 20 | 3 | 280 | 1.0 |
| 21 | 2½ | 260 | 1.0 |
| 22 | 1 | 275 | 1.1 |
| 23 | 1 | 280 | 0.9 |
| 24 | 1 | 280 | 0.8 |
| 25 | 2 | 260 | 1.2 |
| 26 | 3 | 275 | 0.8 |

Examination of the tabular data reveals that in some instances as little as one-half mole of water is eliminated per diamide dehydration; in other instances, as much as 1½ moles per ml. of diamide dehydration. Reducing this ratio to a whole number, it means that in some instances dehydration eliminates one mole of water from 2 moles of diamide, and in some instances eliminates as much as 3 moles of water from 2 moles of diamide. Re-examination of the previous formula concerned with polymerization by intermolecular nitrile formation indicates the initial reaction might eliminate, and probably does eliminate, one mole of water from two moles and the diamide. Further reactions have taken place, particularly in derivatives, where there is more than one secondary amino radical, tetra-ethylene pentamine, for example, with the elimination of three moles of water from two moles of diamide.

The present invention is concerned with the use of materials in which a high molal group, i.e., 8 carbon atoms or more, is introduced by virtue of the naphthenyl radical. Although the preference is to use, for reasons of economy, the non-substituted amines such as diethylenetriamine, triethylenetetramine, tetraethylenepentamine, etc., the mono-substituted polyamines may be employed such as the monomethylated, monoethylated, or monobutylated products, etc., provided the alkyl radical so introduced has less than 8 carbon atoms. This conforms to the requirement that the polyamino reactant have present at least 3 basic nitrogen atoms and a primary amino group and a secondary amino group.

There are available polyamines in which the terminal alkyl substituent has 8 carbon atoms or more, with particular reference to radicals obtained from fatty acids having 12, 14, 16, 18 or more carbon atoms. It has been found these products also can be used in the manner herein described and in some instances give considerably greater oil solubility and have some inherent advantages.

Reference to the basic products herein described for use as inhibitors includes not only the products as such but also in salt form and particularly combinations which tend to increase the solubility in a selected solvent or system, as, for example, the addition of fatty acids, dimeric acids, naphthenic acids, or the like, to promote oil solubility.

PART 5

The inhibitor materials described in Part 4 can be added as such to the distillate hydrocarbon fuels. They are conveniently added, however, in the form of a solution in, for example, xylene or kerosene.

The following examples illustrate the thermal stability of the products of this invention.

Example A

The product of Example 6 as a 50 volume percent solution in xylene was added in the amount of 2.08 and 1.04 milliliters respectively to two 5.5 gallon samples of a typical JP-4 type fuel having the following characteristics:

| | |
|---|---|
| Fuel type | JP-4 Mid-Continent crude |
| Gravity, ° API | 53.9 |
| RVP | 2.3 |
| Distillation: | |
|   Initial boiling point, ° F | |
|   5% evaporated, ° F | |
|   10% evaporated, ° F | |
|   15% evaporated, ° F | |
|   20% evaporated, ° F | 266 |
|   50% evaporated, ° F | 307 |
|   80% evaporated, ° F | |
|   90% evaporated, ° F | 356 |
|   Final boiling point, ° F | 483 |
|   Recovery, percent | 99.0 |
|   Residue, percent | 1.0 |
|   Less, percent | 0.0 |
| Percent evaporated at 400° F | 93.5 |
| Existent gum, mg./100 ml | 3.0 |
| Potential gum, mg./100 ml | 13.2 |
| Total sulfur, percent | 0.08 |
| Mercaptan sulfur, percent | 0.00 |
| Pressing point, ° F | <−67 |
| Smoke volatility index | 66 |
| Smoke point, mm | 27 |
| Water tolerance, ml | 1 |
| Aniline-gravity constant | 7115 |
| Heat of combustion, net B.t.u./lb. (calc.) | 18,800 |
| Aromatics, volume, percent | 13.9 |
| Olefins, volume percent | 1.0 |
| Galer, Saybolt | .18 |

These fuel samples, together with a 5.5 gallon raw fuel sample were tested according to a research technique and in research equipment designed to establish the temperature at which fuels start either to form visible preheater deposits or to plug the fuel filter.

The results of these tests using a preheater temperature of 300° F., a filter temperature of 400° F., and a fuel flow rate of six pounds per hour were as follows:

| Fuel | Filter merit rating | Preheater rating |
|---|---|---|
| Raw fuel | 46 | 0 |
| Raw fuel plus 25 p.p.m. Ex. 6 | 57 | 0 |
| Raw fuel plus 50 p.p.m. Ex. 6 | 81 | 0 |

A filter merit rating above 53 and a preheater rating of less than 2 indicates that the fuel has satisfactory thermal stability.

Example B

Samples of a fresh commercial diesel fuel were prepared containing two commercial sludge inhibitors of the type and in the amount indicated in the following Table III. Also samples of the same diesel fuel were prepared containing the inhibitor of Example 6 in the amounts indicated in Table III.

These samples, together with a sample of the raw fuel, were subjected to a thermal stability test in which each sample was heated for 90 minutes at 300° F. and allowed to cool for two hours following which it was filtered through moderately retentive filter paper to collect sludge particles. The color of the filtrate oil in optical density units was then determined in an A.C. Model Fisher Electrophotometer using Filter No. 510-A and n-heptane set at zero ODU. Sludge was determined by observing the degree of stain on the filter paper. The results are set forth in Table III below.

TABLE III

| Additive | Amount, p.p.m. | Stain | Color, O.D.U. |
|---|---|---|---|
| None | | Very heavy | 100+ |
| Product A [1] | 100 | Light | 36.8 |
| Product B [2] | 100 | do | 42.6 |
| Example 6 | 50 | Very light | 23.4 |
| Do | 75 | do | 22.5 |
| Do | 100 | do | 21.5 |
| Do | 150 | do | 20.8 |

[1] Product A is a commercial methacrylate polymer type fuel oil additive.
[2] Product B is a tertiary dodecyl amine type fuel oil additive.

Having thus described our invention, what we claim as new and desire to secure by Letters Patent is:

1. As a fuel composition, a distilled hydrocarbon fuel having a boiling range of about 135° F. to 700° F. containing a small amount, sufficient to stabilize the fuel with respect to the formation of thermal degradation products including sludge and undesirable color bodies, of the soluble basic reaction product obtained by heating at an elevated temperature up to about 280° C. sufficient for amide dehydration to occur a diamide of the formula $$\underset{R''C}{\overset{H}{\diagdown}}N-R-\left(\overset{H}{N}R\right)_n-N\underset{CR''}{\overset{R_1}{\diagup}}$$
$$\underset{\parallel}{O} \qquad \underset{\parallel}{O}$$

in which R'' is the naphthenyl radical of a polycyclic naphthenic acid of an average type formula selected from the class consisting of $C_nH_{2n-4}O_2$ and $C_nH_{2n-5}O_2$, having an average molecular weight within the range of 290 to 450 and in which the beta carbon atom is a part of a ring structure; R is an alkylene radical having not over 6 carbon atoms, $R_1$ is a member of the class selected from hydrogen and low molal alkyl radicals having less than 8 carbon atoms, and $n$ is a small whole number varying from one to four; said diamide derived product being obtained by a reaction involving polymerization by way of dehydration; said product being further characterized by the absence of a cyclic amidine structure and said dehydration of the diamide eliminating from .5 to 1.5 moles of water per molecule of diamide.

2. The fuel composition of claim 1 in which R'' is the naphthenyl radical of a naphthenic acid having the general structure $$\text{H}_3\text{C}-\text{C}\overset{\text{H}\;\;\text{H}}{\underset{\text{H}-\text{C}}{\diagdown\;\diagup}}\overset{\text{CH}_3}{\underset{\text{C}}{\text{C}}}-\overset{\text{CH}_3}{\underset{\text{C}}{\text{C}}}-\overset{\text{CH}_3}{\underset{\text{C}-\text{CH}_3}{\text{C}}}-\overset{\text{H}\;\;\text{O}}{\underset{\text{H}}{\text{C}-\text{C}}}-\text{OH}$$

3. The fuel composition of claim 2 in which R is an ethylene radical, $n$ is 1, $R_1$ is a hydrogen atom, and R'' is the naphthenyl radical of a naphthenic acid having an average molecular weight of deoiled acid of about 330 and an average molecular formula of $C_{21}H_{37}O_2$.

4. The fuel composition of claim 3 in which the inhibitor is present in an amount of about 10 to about 500 p.p.m. of distilled hydrocarbon fuel.

(References on following page)

References Cited in the file of this patent

UNITED STATES PATENTS

| | | |
|---|---|---|
| 2,291,396 | Lieber | July 28, 1942 |
| 2,322,201 | Jayne et al. | June 15, 1943 |
| 2,415,356 | Kellog et al. | Feb. 4, 1947 |
| 2,520,720 | Harman et al. | Aug. 29, 1950 |
| 2,598,213 | Blair | May 27, 1952 |
| 2,622,018 | White et al. | Dec. 16, 1952 |
| 2,805,135 | Bell et al | Sept. 3, 1957 |
| 2,902,447 | Gunderson et al. | Sept. 1, 1959 |